United States Patent
Mosher, Jr. et al.

(10) Patent No.: US 6,691,115 B2
(45) Date of Patent: Feb. 10, 2004

(54) SYSTEM AND METHOD FOR PURGING DATABASE UPDATE IMAGE FILES AFTER COMPLETION OF ASSOCIATED TRANSACTIONS FOR A DATABASE REPLICATION SYSTEM WITH MULTIPLE AUDIT LOGS

(75) Inventors: Malcolm Mosher, Jr., Los Gatos, CA (US); Peter Simon Whitworth, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 245 days.

(21) Appl. No.: 09/883,067

(22) Filed: Jun. 15, 2001

(65) Prior Publication Data

US 2002/0194204 A1 Dec. 19, 2002

(51) Int. Cl.$^7$ .................................................. G06F 17/30
(52) U.S. Cl. ........................ 707/10; 707/200; 707/202; 707/204
(58) Field of Search ............................ 707/2, 10, 200, 707/202, 204

(56) References Cited

U.S. PATENT DOCUMENTS

| | | | | |
|---|---|---|---|---|
| 5,469,503 A | * | 11/1995 | Butensky et al. | 379/265.02 |
| 5,561,795 A | * | 10/1996 | Sarkar | 707/202 |
| 5,673,382 A | * | 9/1997 | Cannon et al. | 714/6 |
| 5,682,527 A | * | 10/1997 | Cooper et al. | 707/202 |
| 5,740,433 A | * | 4/1998 | Carr et al. | 707/202 |
| 5,745,753 A | * | 4/1998 | Mosher, Jr. | 707/202 |
| 5,794,252 A | * | 8/1998 | Bailey et al. | 707/202 |
| 5,799,322 A | * | 8/1998 | Mosher, Jr. | 707/202 |
| 5,799,323 A | * | 8/1998 | Mosher et al. | 707/202 |
| 5,835,915 A | * | 11/1998 | Carr et al. | 707/202 |
| 5,884,328 A | * | 3/1999 | Mosher, Jr. | 707/202 |

OTHER PUBLICATIONS

U.S. patent application Ser. No. 09/883,067, filed Jun. 15, 2001, Mosher et al., "System and Method for Purging Database Update Image Files After Completion of Associated Transactions For A Database Replication System With Multiple Audit Logs".

U.S. patent application Ser. No.: 09/418,427, filed Oct. 14, 1999, Malcolm Mosher, "High Speed System And Method For Replicating A Large Database At A Remote Location".

U.S. patent application Ser. No.: 09/418,425, filed Oct. 14, 1999, Mosher et al., "System and Method for Purging Database Update Image Files After Completion of Associated Transactions".

U.S. patent application Ser. No. 09/883,066, filed Jun. 15, 2001, Malcolm Mosher, "Ultra–High Speed Database Replication With Multiple Audit Logs".

(List continued on next page.)

*Primary Examiner*—Safet Metjahic
*Assistant Examiner*—Haythim J. Alaubaidi

(57) ABSTRACT

A method and system for purging database update image files after completion of associated transactions for a database replication system with multiple audit logs. Audit update records and audit backout records are generated by the primary system, and are transmitted to the backup system in multiple streams in parallel. The backup system stores the received audit records as audit image trails, and applies the audit updates and audit backouts to the backup database without regard to whether the associated transactions committed or aborted. Because audit updates and audit backouts are applied without regard to whether the associated transactions committed or aborted, image files containing audit records associated with transactions that have not yet committed or aborted must not be purged. The present invention provides for a method for determining whether an image trail file contains audit records that can be purged such that image trail files can be safely deleted.

18 Claims, 10 Drawing Sheets

OTHER PUBLICATIONS

U.S. patent application Ser. No.: 09/418,425, filed Oct. 14, 1999, Mosher et al., "System and Method for Purging Database Update Image Files After Completion of Associated Transactions".

U.S. patent application Ser. No.: 09/418,427, filed Oct. 14, 199, Malcolm Mosher, "High Speed System and Method For Replicating A Large Database At A Remote Location".

* cited by examiner

SYSTEM AND METHOD FOR PURGING DATABASE UPDATE IMAGE FILES AFTER COMPLETION OF ASSOCIATED TRANSACTIONS FOR A DATABASE REPLICATION SYSTEM WITH MULTIPLE AUDIT LOGS

RELATED APPLICATIONS

This application is related to, and incorporates by reference, co-pending United States patent application entitled "ULTRA-HIGH SPEED DATABASE REPLICATION WITH MULTIPLE AUDIT LOGS", filed Jun. 15, 2001, and bearing Ser. No. 09/883,066, and co-pending United States patent application entitled "SYSTEM AND METHOD FOR PURGING DATABASE UPDATE IMAGE FILES AFTER COMPLETION OF ASSOCIATED TRANSACTIONS", filed Oct. 14, 1999, bearing Ser. No. 09/418,425.

BRIEF DESCRIPTION OF THE INVENTION

The present invention relates generally to database management systems having a primary database facility and a duplicate or backup database facility. More particularly, the present invention relates to system and method for purging database update image files after completion of associated transactions for a database replication system with multiple audit logs.

BACKGROUND OF THE INVENTION

The present invention is an improvement on the Tandem "remote data facility" (RDF) technology disclosed in U.S. Pat. No. 5,740,433, U.S. Pat. No. 5,745,753, U.S. Pat. No. 5,794,252, U.S. Pat. No. 5,799,322, U.S. Pat. No. 5,799,323, U.S. Pat. No. 5,835,915, and U.S. Pat. No. 5,884,328, all of which are hereby incorporated by reference as background information.

Prior art RDF technology underwent a number of changes over time to increase the peak number of transactions per second that can be performed on the primary system and replicated on the backup system. In a current adaptation, RDF technology uses multiple audit logs, or audit trails, to keep track of database updates and backouts of RDF-protected database volumes. With the utilization of multiple audit logs, a large increase in the rate at which transactions performed on the primary system can be replicated on the backup system. The utilization of multiple audit logs violates basic assumptions of the prior art systems, requiring both redesign of prior art mechanisms and some completely new mechanisms, to ensure that the backup system maintains "soft synchronization" with the primary system during normal operation, and to also ensure that the backup system can be brought to an entirely consistent internal state whenever the backup system needs to perform a takeover operation and be used as the primary system.

In particular, one of the new mechanisms that need to be revamped is the file purging mechanism. In prior art RDF systems, where there is only a single audit trail, the mechanisms for determining whether an image trail file may be purged (permanently deleted) is rather straight-forward. The above-mentioned co-pending United States patent application entitled "SYSTEM AND METHOD FOR PURGING DATABASE UPDATE IMAGE FILES AFTER COMPLETION OF ASSOCIATED TRANSACTIONS" describes such a technique. The utilization of the multiple audit logs creates another level of complexity and suggests the need for a new file purge mechanism for purging unneeded image trail files.

SUMMARY OF THE INVENTION

In summary, the present invention provides for an efficient method for determining whether an image file contains audit records associated with transactions that have not yet committed or aborted such that image trail files can be safely deleted without adverse consequence. The present invention is preferably practiced in a distributed computer database system having a local computer system and a remote computer system. The local computer system has a local database stored on local memory media, application programs that modify the local database, and a transaction manager that stores audit records in multiple local audit trails reflecting those application program modifications to the local database. The transaction manager stores in a particular one of the local audit trails transaction state records indicating the transaction states of the transactions making those database modifications. The valid transaction states of a transaction can be committed, aborted, active, aborting or prepared. The particular local audit trail is referred to as a MAT (master audit trail). The other local audit trails are referred to as AuxATs (auxiliary audit trails). The transaction manager also stores in the MAT a type of records known as Auxiliary Pointer Records, which indicate the range of audit records in the AuxATs that were flushed to disks since the last Auxiliary Pointer Record.

The remote computer system, remotely located from the local computer system, has a backup database stored on remote memory media associated with the remote computer system.

A remote duplicate data facility (RDF) is partially located in the local computer system and partially in the remote computer for maintaining virtual synchronization of the backup database with the local database. The RDF includes multiple Extractor processes that execute on the local computer system, and multiple Receiver processes and multiple Updater processes that execute on the remote computer system.

A Master Extractor process extracts audit records from the MAT, and each of the Auxiliary Extractor processes extracts auxiliary audit records from one of the AuxATs. The Extractor processes, when extracting audit records from the MAT and the AuxATs, insert an Audit Trail Position (ATPosn) value in each audit record. The Extractor processes then transmit the extracted audit records to the remote computer system.

The Receiver processes receive the extracted audit records from the Extractor processes and distribute the extracted audit records to one or more image trails in the remote computer system. Each Receiver process is also responsible of storing the ATPosn of the last audit record it received. The Receiver processes are each mapped to one of the Extractor processes. A Master Receiver process receives audit records from the Master Extractor, and each Auxiliary Receiver processes receive audit records from one of the Auxiliary Extractor processes. The audit records include audit update and audit backout records indicating database updates and database backouts generated by transactions executing on the local computer system. Control-type audit records, which only appear in the MAT, are distributed to a Master Image Trail (MIT). Data-type audit records of the MAT are distributed to MAT-based Secondary Image Trails (SITs). Audit records of the AuxATs are distributed to AuxAT-based SITs. Note that data-type audit records of the MAT or the AuxATs may be distributed to more than one SITs. In one embodiment of the invention, data-type audit records and transaction state records contain Transaction IDs each consisting of a system (node) number, a CPU number and a transaction sequence number. In some embodiments, a transaction ID may consist of a transaction sequence number and a system number or a CPU number and/or some other information for uniquely identifying a transaction.

The Master Receiver uses a counter to maintain a count of TMP Control Point Records it received. The counter is known as the TMP Control Point Count. When the Master Receiver receives a TMP Control Point Record, it durably stores the current SysTxList record, initializes a new SysTxList record, increments the TMP Control Point Count and stores the TMP Control Point Count in the new SysTxList record. The Master Receiver updates the SysTxList record whenever it receives a Transaction State Record (transtate record), an Auxiliary Pointer Record, a data-type record or any audit record having one or more Transaction ID(s). When the Master Receiver receives another TMP Control Point Record, the SysTxList record is considered completed and is durably stored. The Master Receiver then initializes a new SysTxList record.

A SysTxList record contains information indicating the range of active transactions that were processed by the local computer system during a particular TMP Control Time Frame. Specifically, a SysTxList record contains a TMP Control Point Count that is associated with the TMP Control Time Frame. A SysTxList record also contains, for each CPU in each Node of the local computer system, the Lowest Transaction Sequence Number (Lo_Tx_Seq_Num) and the Highest Transaction Sequence Number (Hi_Tx_Seq_Num) of the transactions that were processed during that particular TMP Control Time Frame. The SysTxList also contains, for each Auxiliary Audit Trail, the lowest Low-Water-Mark and the highest High-Water-Mark of the Auxiliary Pointer Records of that particular TMP Control Time Frame. SysTxList records are stored in SysTxList Lookup Files.

Image Trails are stored in Image Trail Files that have sequentially numbered file names and a fixed file size (configurable for each system). When the Master Receiver creates a new Image Trail File, it writes the current TMP Control Point Count (i.e., the TMP Control Point Count that has been written to the current SysTxList record) in the file's header. When an Auxiliary Receiver opens a new Image Trail File, it writes the Audit Trail Position of the audit record that the Auxiliary Receiver most recently received from the corresponding Auxiliary Extractor in the file's header. The information contained in the headers of the files will be used for determining whether the files can be purged.

For each SIT there is an Updater that applies to a backup database volume the database updates and backouts indicated by the audit update and audit backout records in the SIT. The audit update and audit backout records are applied to the backup database volume in same order that they are stored in the image trail, without regard to whether corresponding transactions in the primary system committed or aborted. An Updater reads the Image Trail Files one file at a time and keeps track of the TMP Control Point Count or High-Water-Mark position it extracted from the current file's header. Periodically, a MAT-based Updater sends the extracted TMP Control Point Count to the Purger, and an AuxAT-based Updater sends the extracted High-Water-Mark to the Purger.

The Purger periodically builds a HWM-to-TMP_Ctrl_Pt_Cnt Table and Composite SysTxList for determining whether an Image Trail File contains audit records that may be needed by the Updater processes for performing an Updater Undo Process. The Composite SysTxList contains, for each CPU in each NODE of the local computer system, the lowest transaction sequence number and the highest transaction sequence number for transactions that are considered "active" by the Updaters. The HWM-to-TMP_Ctrl_Pt_Cnt Table contains, for each TMP_Ctrl_Pt_Cnt and for each Auxiliary Audit Trail, a Low Low-Water-Mark and a High High-Water-Mark of Auxiliary Pointer Records of that TMP Control Time Frame. After the Purger constructed the HWM-to-TMP_Ctrl_Pt_Cnt Table and Composite SysTxList, the Purger accesses the Image Trail Files, and for each Image Trail File the Purger retrieves a corresponding SysTxList and compares it against the Composite SysTxList to determine whether any earlier Image Trail Files can be purged.

BRIEF DESCRIPTION OF THE DRAWINGS

Additional objects and features of the invention will be more readily apparent from the following detailed description and appended claims when considered in conjunction with the drawings, in which:

DESCRIPTION OF THE PREFERRED EMBODIMENTS

Overview of RDF System

Figure 1A:
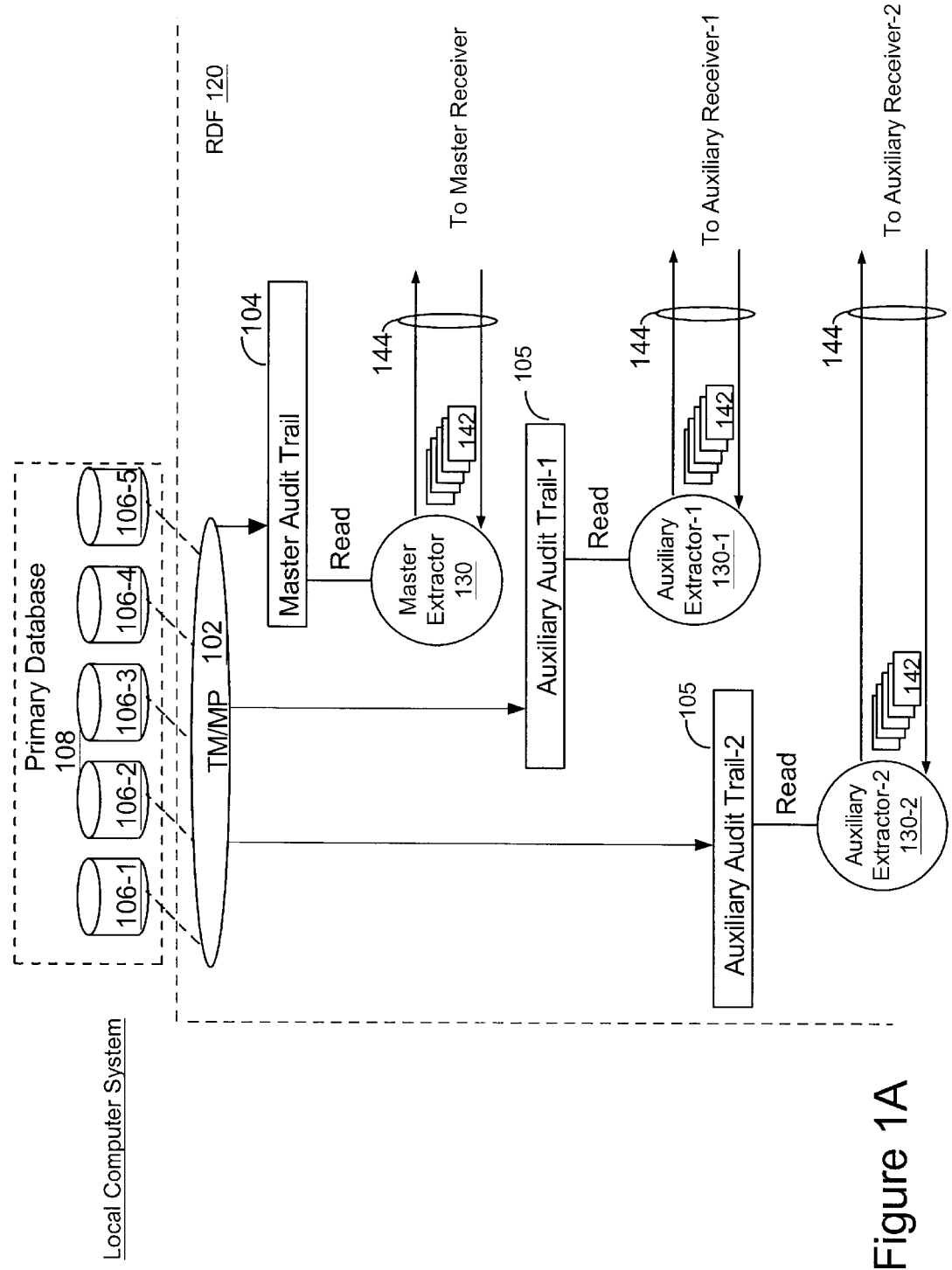
FIGS. 1A and 1B are block diagrams illustrating a database management system with a remote duplicate database facility in accordance with an embodiment of the present invention.
Figure 1B:
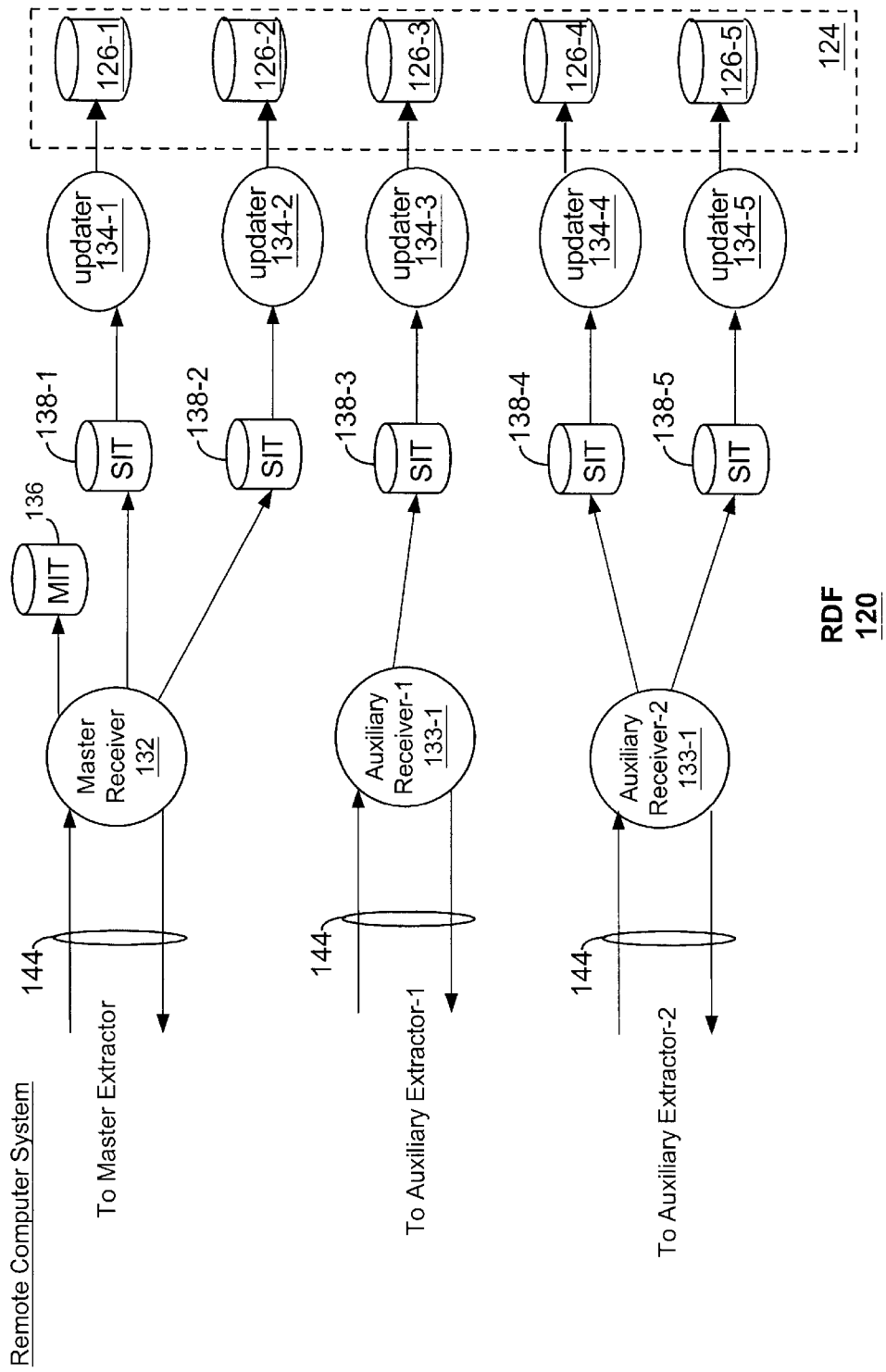

FIGS. 1A and 1B represent the basic architecture of an RDF system 120 according to one embodiment of the present invention. In RDF system 120, each process has a respective local backup process that is automatically invoked if the primary process fails. Each local backup process is located on a different CPU than its respective primary process, and provides a first level of fault protection. A primary purpose of the RDF (remote data facility) system 120 is to handle failures in the primary system that cannot be resolved through the use of local backup processes (and other local remedial measures), such as a complete failure of the primary system.

FIG. 1A illustrates a portion of the RDF system 120 that resides on a local computer system. As illustrated, the RDF system 120 has a transaction management facility (TM/MP) 102 that writes audit entries into a plurality of audit trails 104,105. The audit entries indicate changes made to "audited files" on "RDF protected volumes" 106 of a primary database 108 on a local computer system. Some RDF protected volumes are configured to write transaction audit records to the MAT 104, while some RDF protected volumes are configured to write transaction audit records to the AuxATs 105. The transaction manager 102 stores in a Master Audit Trail (MAT) 104 commit/abort records indicating which of the transactions making those database modifications committed and which aborted. The transaction manager 102 also stores in the MAT 104 a type of records known as Auxiliary Pointer Records, which indicate the range of audit records in the AuxATs that were flushed to disks since the last Auxiliary Pointer Record.

FIG. 1B illustrates another portion of the RDF system 120 that resides on a remote computer system. The remote computer system may be geographically removed from the local computer system. In some embodiments, the local computer system and the remote computer system may be located on different continents. The RDF 120 maintains a replicated database 124 (also called the backup database) by monitoring changes made to "audited files" on "RDF protected volumes" 106 on a primary system and applying those changes to corresponding backup volumes 126 on the remote computer system. An "audited file" (sometimes called an "RDF audited file") is a file for which RDF protection has been enabled, and an "RDF protected volume" is a logical or physical unit of disk storage for which RDF protection has been enabled. As shown in FIG. 1B, the RDF system 120 includes multiple Receiver processes 132, 133, multiple Updater processes 134 and a Purger 140, all of which execute on the remote computer system.

On the local computer system, a Master Extractor process 130 reads the master audit trail (MAT) 104, which is a log maintained by the transaction management facility (TM/MP) 102, and sends the audit records extracted from the MAT 104 to a Master Receiver process 132 on the remote computer system. When the Master Extractor process 130 extracts the audit records from the MAT 104, the Master Extractor process 130 inserts Audit Trail Position (ATPosn) values into the audit records. Thus, the Master Receiver process 132 receives audit records that contain the records' positions on the MAT 104.

The MAT 104 is stored as a series of files with sequentially numbered file names. The MAT files are all of a fixed size (configurable for each system), such as 64 Mbytes. The TMF 102 and Master Extractor 130 both are programmed to progress automatically (and independently) from one MAT file to the next.

Auxiliary Extractor processes 131 reads the auxiliary audit trails (AuxATs) 105, which are also audit logs maintained by the transaction management facility (TM/MP) 102. After extracting audit records from the AuxATs 105, the Auxiliary Extractor processes 131 insert in the audit records Audit Trail Position (ATPosn) values corresponding to the positions of the audit records in their respective AuxATs, and send the extracted audit records to Auxiliary Receiver processes 133 on the remote computer system. The Auxiliary Receiver processes 133 thus receive audit records of the AuxATs 105 that contain the records' positions on their respective AuxATs 105.

The Receiver processes 132, 133 receive the extracted audit records from the Extractor processes 130 and distribute the extracted audit records to one or more image trails 136, 138 in the remote computer system. The Receiver processes 132, 133 are each mapped to one of the Extractor processes 130. Specifically, a Master Receiver 132 process receives audit records from the Master Extractor 130, and each Auxiliary Receiver processes 133 receive audit records from one of the Auxiliary Extractor processes (e.g., 130-1, 130-2). Control-type audit records, which only appear in the MAT 104, are distributed to a Master Image Trail (MIT) 136. Data-type audit records of the MAT 104 are distributed to MAT-based Secondary Image Trails (SITs) (e.g., 138-1, 138-2). Audit records of the AuxATs 105 are distributed to AuxAT-based SITs (e.g., 138-3, 138-4, 138-5). Note that data-type audit records of the MAT 104 or the AuxATs 105 may be distributed to more than one SITs.

For each SIT 138 there is at least one Updater process 134 that applies to a backup database volume 126 the database updates and backouts indicated by the audit update and audit backout records in the SIT 138. The audit update and audit backout records are applied to the backup database volume 126 in same order that they are stored in the image trail, without regard to whether corresponding transactions in the primary system committed or aborted.

Audit Trails Audit Record Types

Figure 3:
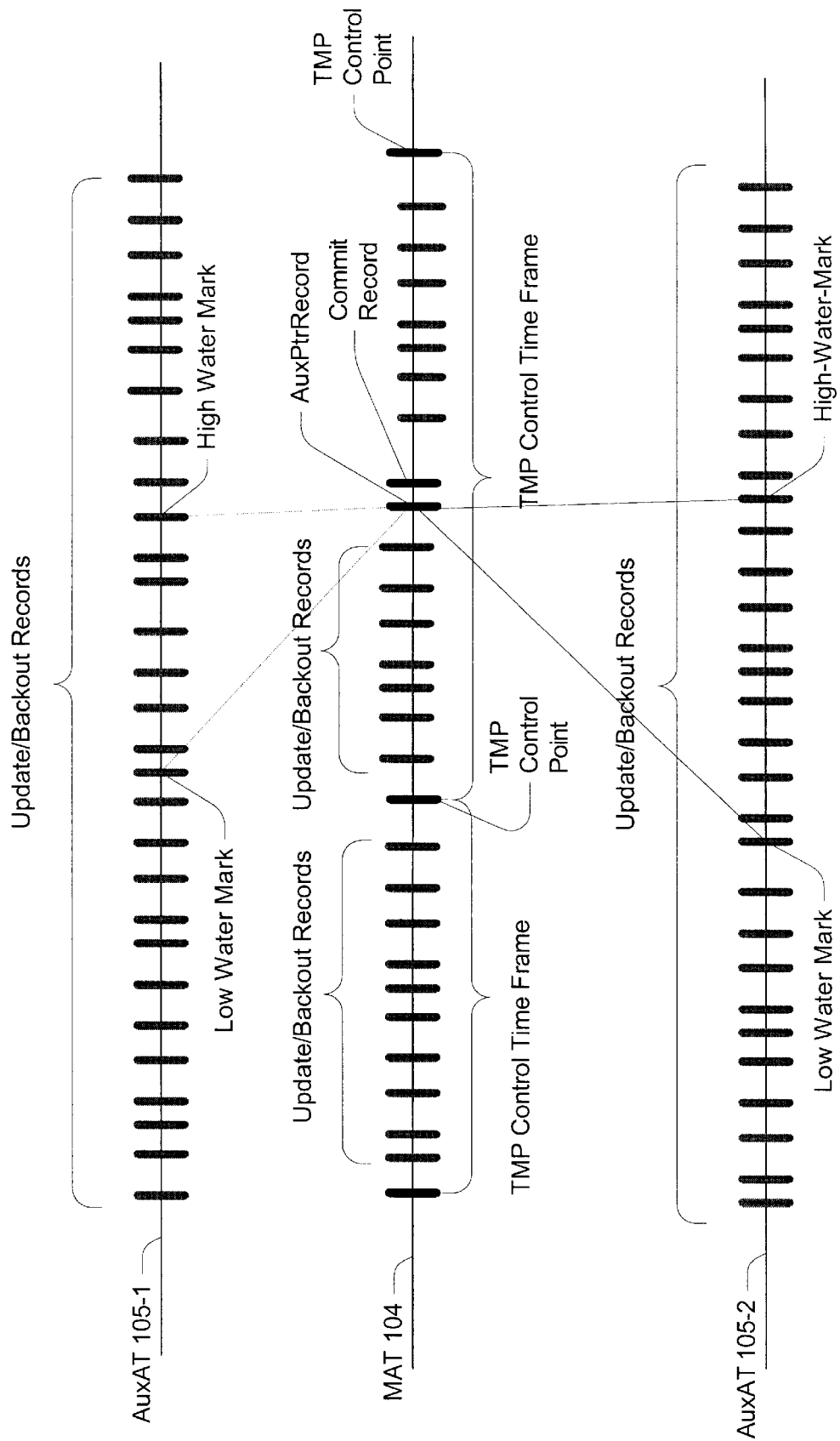
FIG. 3 illustrates a graphical representation of a Master Audit Trail and two Auxiliary Audit Trails in accordance with an embodiment of the present invention.

FIG. 3 is a graphical representation of the MAT 104 and two AuxATs 105. As shown, the master audit trail (MAT) 104 contains the following types of records:

Update records, which reflect changes to a database volume made by a transaction by providing before and after record images of the updated database record. Each update record indicates the transaction ID of the transaction that made the database change and the identity of the database volume and database record that has been updated. In a presently preferred embodiment, a transaction ID consists of a system (node) number (corresponding to a node in the local computer system at which the transaction is processed), a CPU number (corresponding to a CPU in the node at which the transaction is processed), and a transaction sequence number (TX_SEQ_NUM), which is a number assigned to each transaction unique to a particular CPU within a particular node of the local computer system.

Backout records, which reflect the reversal of previous changes made to a database volume on the primary system. The database changes represented by backout records are sometimes herein called update backouts and are indicated by before and after record images of the updated database record. Backout audit records are created when a transaction is aborted and the database changes made by the transaction need to be reversed. Each backout record indicates the transaction ID of the transaction that made the database change and the identity of the database volume and database record that has been modified by the update backout.

Transaction state records (or, transtate records), including commit and abort records and transaction active records. Commit and abort records indicate that a specified transaction has committed or aborted. Transaction active records (also sometimes called transaction alive records) indicate that a transaction is active. Each transaction state record indicates the transaction ID of the transaction whose state is being reported. Every active transaction is guaranteed to produce one transaction state record during each TMP control time frame (i.e., between successive TMP control points) other than the TMP control time frame in which the transaction began. A transaction active record is stored in the master audit trail if the transaction does not commit or abort during a TMP control time frame.

TMP control point records, which are "timing markers" inserted by the TMF 102 into the master audit trail at varying intervals depending on the system's transaction load. During heavy transaction loads, TMP control point records may be inserted less than a minute apart; at moderate transaction loads the average time between TMP control point records is about 5 minutes; and under very light loads the time between TMP control point records may be as long as a half hour. The set of audit records between two successive TMP control point records are said to fall within a "TMP control time frame".

Auxiliary Pointer Records, which include a High-Water-Mark and a Low-Water-Mark for each of the Auxiliary Audit Trails 105, that indicate the range of audit records written to the Auxiliary Audit Trails 105 since the last Auxiliary Pointer Record was written to the MAT.

The MAT 104 further includes:

Stop Updaters records, which cause all Updaters to stop when they read this record in their image trails.

Other records not relevant to the present discussion.

The auxiliary audit trails (AuxAT) 105 contain the following types of records:

Update records, which reflect changes to a database volume made by a transaction by providing before and after record images of the updated database record. Each update record indicates the transaction ID of the transaction that made the database change and the identity of the database volume and database record that has been updated. As mentioned above, in a presently preferred embodiment a transaction ID consists of a node number, a CPU number, and a transaction sequence number (TX_SEQ_NUM).

Backout records, which reflect the reversal of previous changes made to a database volume. The database changes represented by backout records are sometimes herein called update backouts and are indicated by before and after record images of the updated database record. Backout audit records are created when a transaction is aborted and the database changes made by the transaction need to be reversed. Each backout record indicates the transaction ID of the transaction that made the database change and the identity of the database volume and database record that has been modified by the update backout.

Other records not relevant to the present discussion.

The Extractor Processes—Overview

Figure 2A:
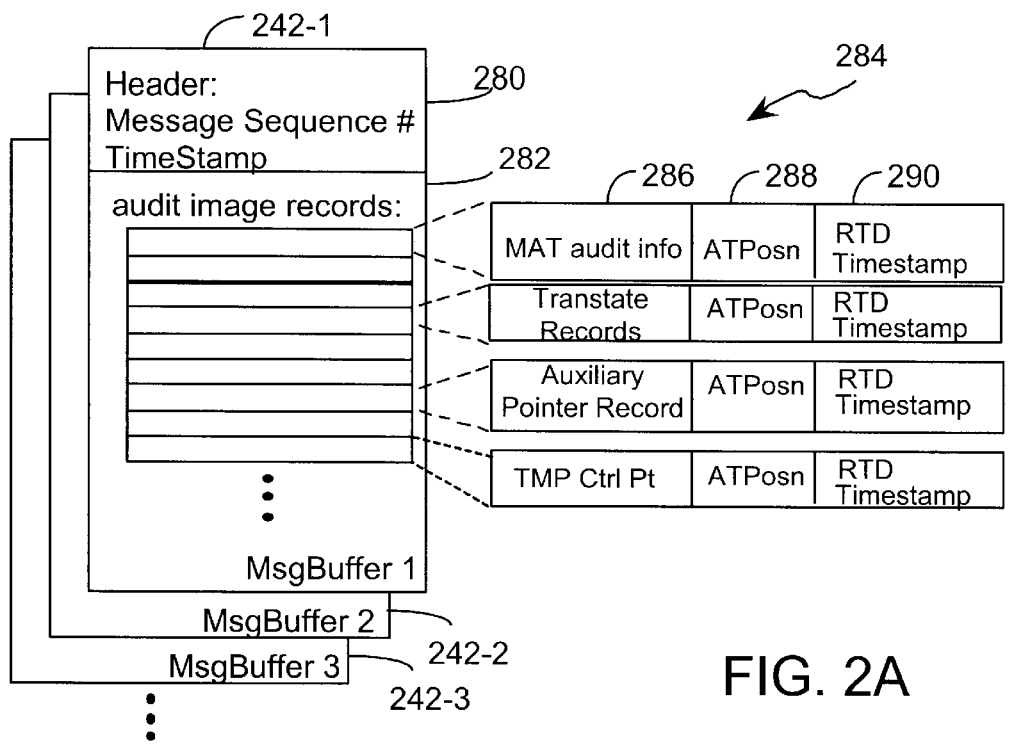
FIGS. 2A and 2B depict data structures used by the extractor processes in accordance with an embodiment of the present invention.

Referring to FIG. 2A, the Master Extractor process 130 adds an Audit Trail Position value (ATPosn) 288 to each audit record that the Master Extractor process 130 extracts from the MAT 104. The ATPosn value is the position of the extracted audit record in the MAT 104. The Master Extractor process 130 also adds a timestamp 290 to each audit record. The added timestamp is known as the RTD timestamp, and is the timestamp of the last transaction to complete prior to generation of the audit record in the MAT 104. The resulting records are called audit image records 284. The Master Extractor process 130 stores each audit image record in message buffers 242, each having a size of about 28K bytes in the preferred embodiment. Note that message buffers 242 for the MAT 104 contain control-type records such as Transaction State Records, TMP Control Point Records, etc., in addition to standard audit information (e.g., update records and backout records).

Figure 2B:
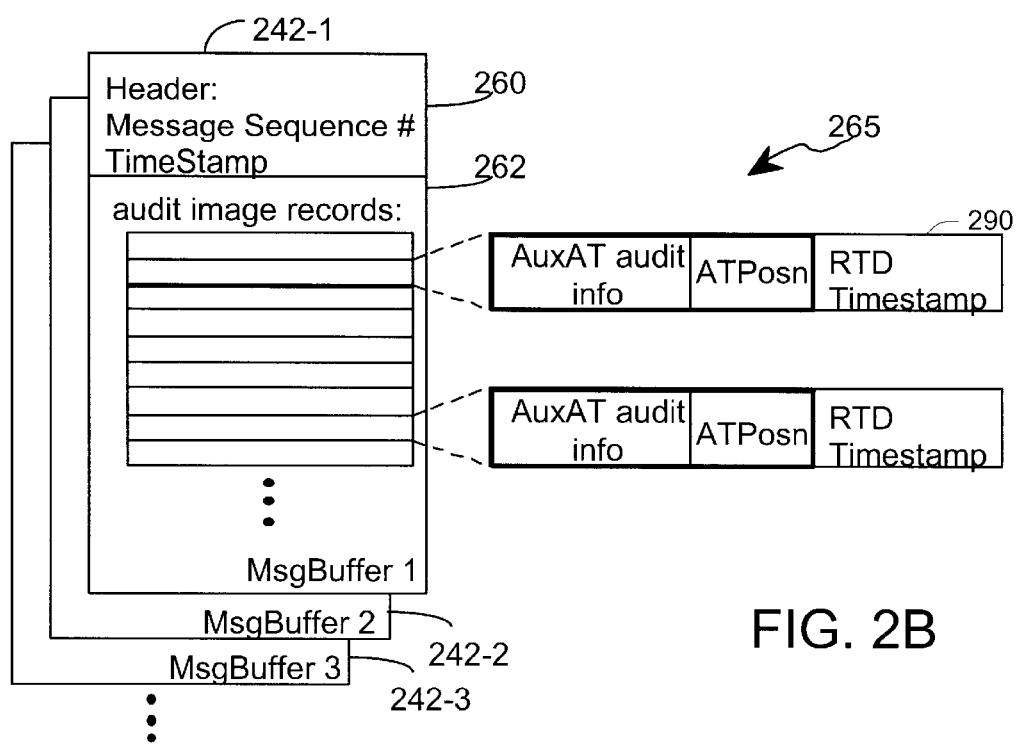

Referring to FIG. 2B, the Auxiliary Extractor processes 131 add an ATPosn value to each audit record that they extract from the AuxATs 105. A timestamp 290 is also added to each audit record. The resulting records are called auxiliary audit image records 285. The Auxiliary Extractor processes 131 store the auxiliary audit image records in message buffers 242. Note that, in a presently preferred embodiment, because the AuxATs 105 do not contain any transaction state records, TMP control point records or Auxiliary Pointer Records, the Auxiliary Extractor processes 131 do not send any such records to the backup system. Thus, the message buffers 242 for the AuxATs 105 do not contain control-type records. In a presently preferred embodiment, each Auxiliary Extractor process 131 is associated with only one of the auxiliary audit trails 105, and vice versa.

Each one of the extractor processes 130, 131 uses two to eight message buffers 242, with four message buffers being a typical configuration. After filling and transmitting a message buffer 242 to the Master Receiver process 132 via a communication channel 144 (FIG. 1), the Master Extractor process 130 does not wait for an acknowledgment reply message from the Master Receiver process 132. Rather, as long as another message buffer is available, it continues processing audit records in the MAT 104, storing audit image records in the next available message buffer 242. Auxiliary Extractor processes 131 also transmit message buffers 242 to Auxiliary Receiver processes 133 in a similar manner. Each message buffer 242 is made unavailable after it is transmitted to the receiver processes 132 and 133 until a corresponding acknowledgment reply message is received from the receiver processes 132 and 133, at which point the message buffer 142 becomes available for use by the extractor processes 130 and 131.

The Receiver Processes—Overview

Referring to FIGS. 1A and 1B, the Master Receiver process 132 and Auxiliary Receiver processes 133 upon receiving each message buffer immediately send an acknowledgment to the corresponding Extractor process. In a presently preferred embodiment, no processing of the message buffer is performed before the acknowledgment is sent. The RDF system provides tight synchronization of the Extractor and Receiver processes and provides for automatic resynchronization whenever a start or restart condition occurs. For example the two processes will resynchronize whenever either process is restarted or has a primary process failure, and whenever the Receiver process receives audit records out of order from the Extractor process.

Figure 4:
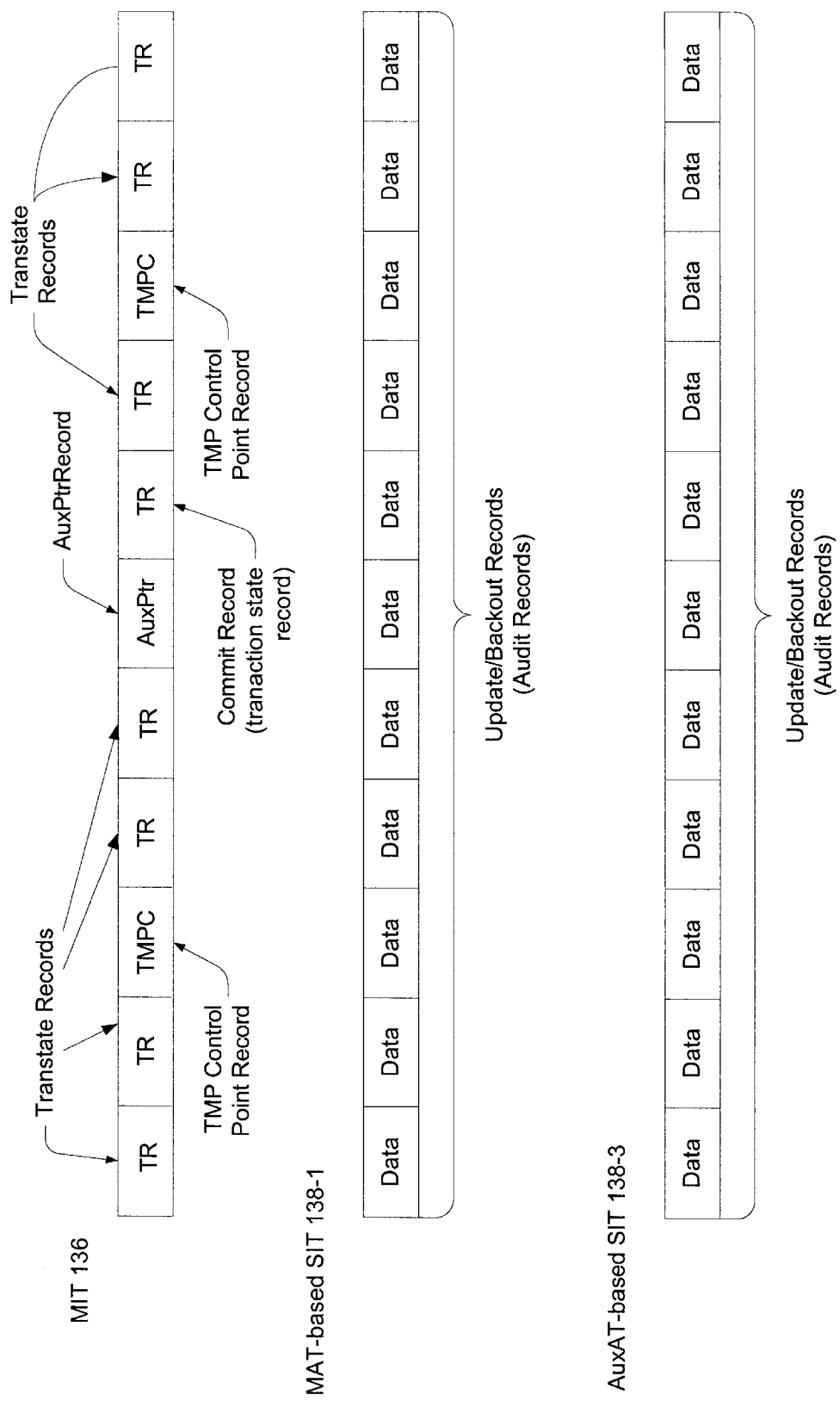
FIG. 4 illustrates a graphical representation of a Master Image Trail and two Secondary Image Trails in accordance with an embodiment of the present invention.

In a presently preferred embodiment, the Master Receiver process 132 sorts received audit records from the MAT 104 such that (A) transaction state records (including commit/abort records), TMP control point records, and Auxiliary Pointer Records are stored only in the master image trail (MIT) 136, and (B) each database update and backout audit record is moved into one or more secondary image trails (SIT) 138. In some embodiments, some control-type records may be stored in the SITs 138. The Auxiliary Receiver processes 133 sort received audit records from AuxATs 105 and distribute the audit records into one or more SITs 138. In the embodiment illustrated in FIG. 1B, each one of the SITs 138 corresponds to one Updater process 134 that will use that audit record to update data stored on a backup volume 126. In some other embodiments, multiple Updater processes 134 and multiple backup volumes 126 maybe associated with a single SIT 138. A graphical representation of the MIT 136 and a SIT 138 is illustrated in FIG. 4. Note that the MIT 136 contains control-type audit records only.

In one embodiment of the present invention, the Master Receiver uses a counter to maintain a count of TMP Control Point Records it received. The counter is known as the TMP Control Point Count. Whenever the Master Receiver process 132 receives a TMP Control Point Record, the Master Receiver process 132 durably stores the current SysTxList record on disk, initializes a new SysTxList record, increments the TMP Control Point Count and stores the incremented TMP Control Point Count in the new SysTxList Record.

Whenever the Master Receiver process 132 receives an audit record, the Master Receiver process 132 extracts its Transaction ID and updates the current SysTxList Record's Lowest Transaction Sequence Number(s) and Highest Transaction Sequence Number(s) with the Transaction Sequence Number(s) contained in the extracted Transaction ID. Specifically, the Master Receiver process 132 compares the Transaction Sequence Number contained in the Transaction ID against the corresponding Lowest Transaction Sequence Numbers (LO_TX_SEQ_NUM) of the current SysTxList record. The lower values are stored in the SysTxList Record as the new Lowest Transaction Sequence Numbers. The Master Receiver process 132 also compares the Transaction Sequence Numbers contained in the Transaction ID against the corresponding Highest Transaction Sequence Numbers (HI_TX_SEQ_NUM) of the current SysTxList record. The higher values are stored in the SysTxList Record as the new Highest Transaction Sequence Numbers. Note that a transaction sequence number is compared against the Lowest Transaction Sequence Number and Highest Transaction Sequence Number of the same CPU and node. Also note that in some embodiments, a transaction identifier may contain multiple numbers for uniquely identifying a transaction.

Whenever the Master Receiver process 132 receives an Auxiliary Pointer Record, it extracts the Low-Water-Marks and High-Water-Marks contained therein and updates the SysTxList record's lowest Low-Water-Marks and highest High-Water-Marks. Master Receiver process 132 compares the High-Water-Marks contained in the Auxiliary Pointer Record against the corresponding highest High-Water-Marks in the SysTxList record and stores the higher values in the SysTxList record. Note that a High-Water-Mark is compared against the highest High-Water-Mark of the same Auxiliary Audit Trail. In one embodiment, the Highest High-Water-Marks of the preceding SysTxList record are used as both the lowest Low-Water-Marks of the current SysTxList record and are not replaced by Low-Water-Marks subsequently retrieved from Auxiliary Pointer Records.

When the Master Receiver process 132 receives another TMP Control Point Record, which signifies the end of the current TMP Control Point Time Frame, the SysTxList record is considered "closed" or "completed," and can be durably stored. A "completed" SysTxList record will contain a TMP Control Point Count that is associated with the current TMP Control Time Frame. A SysTxList record also contains, for each CPU in each Node of the local computer system, the Lowest Transaction Sequence Number (Lo_Tx_Seq_Num) and the Highest Transaction Sequence Number (Hi_Tx_Seq_Num) of the transactions that were processed by during that particular TMP Control Time Frame. The SysTxList also contains, for each Auxiliary Audit Trail, the Lowest Low-Water-Mark and the Highest High-Water-Mark of the Auxiliary Pointer Records of that particular TMP Control Time Frame.

In a presently preferred embodiment, in order to facilitate lookup of the SysTxList, each SysTxList Lookup file contains a fixed number (configurable for each system) of SysTxList records, and the SysTxList records are stored in SysTxList Lookup files, which are files with sequentially numbered (monotonously increasing) file names.

The Master Receiver process 132 also maintains a table of High-Water-Marks for the Auxiliary Audit Trails. In one embodiment, the Master Receiver process 132 sends the High-Water-Marks to the Auxiliary Receivers 133 whenever a Auxiliary Pointer Record is received. In other embodiments, the Master Receiver process 132 periodically sends the High-Water-Marks to the corresponding Auxiliary Receivers 133 to be used as Updater limit positions.

The image trails 136, 138 are stored a series of Image Trail Files with sequentially numbered file names, all having a fixed file size (configurable for each system). Master Receiver 132 increments a TMP Control Point Count and generates a SysTxList for every TMP Control Time Frame (TMP Control Point Interval). When the Master Receiver 132 creates a new Image Trail File, it stores the current TMP Control Point Count (i.e., the TMP Control Point Count that is stored in the current SysTxList record) in the file's header. An Auxiliary Receiver 133, when creating a new Image Trail File, stores the Auxiliary Trail Position (ATPosn) of the last audit record it received from the corresponding Auxiliary Extractor 130 in the file's header. In an embodiment of the present invention, Image Trail Files are configured to store either a TMP Control Point Count or an Audit Trail Position, depending on whether the file is associated with a MAT-based SIT or an AuxAT-based SIT.

Preferably, the Image Trail Files are all of a fixed size (configurable for each system), such as 64 Mbytes. Due to limited storage capacity at the remote computer system, it is desirable to purge Image Trail Files that are no longer needed. Generally, an Image Trail File can be purged (i.e., permanently deleted) when it is absolutely certain that the file contains no audit records that will ever be needed again, even if there is a primary system failure, backup system failure, or both. More specifically, an image trail must not be purged if it contains an audit record for any transaction that has not yet been processed or that is being processed by the Updaters.

SysTxList Records and SysTxList Lookup Files

Figure 7:
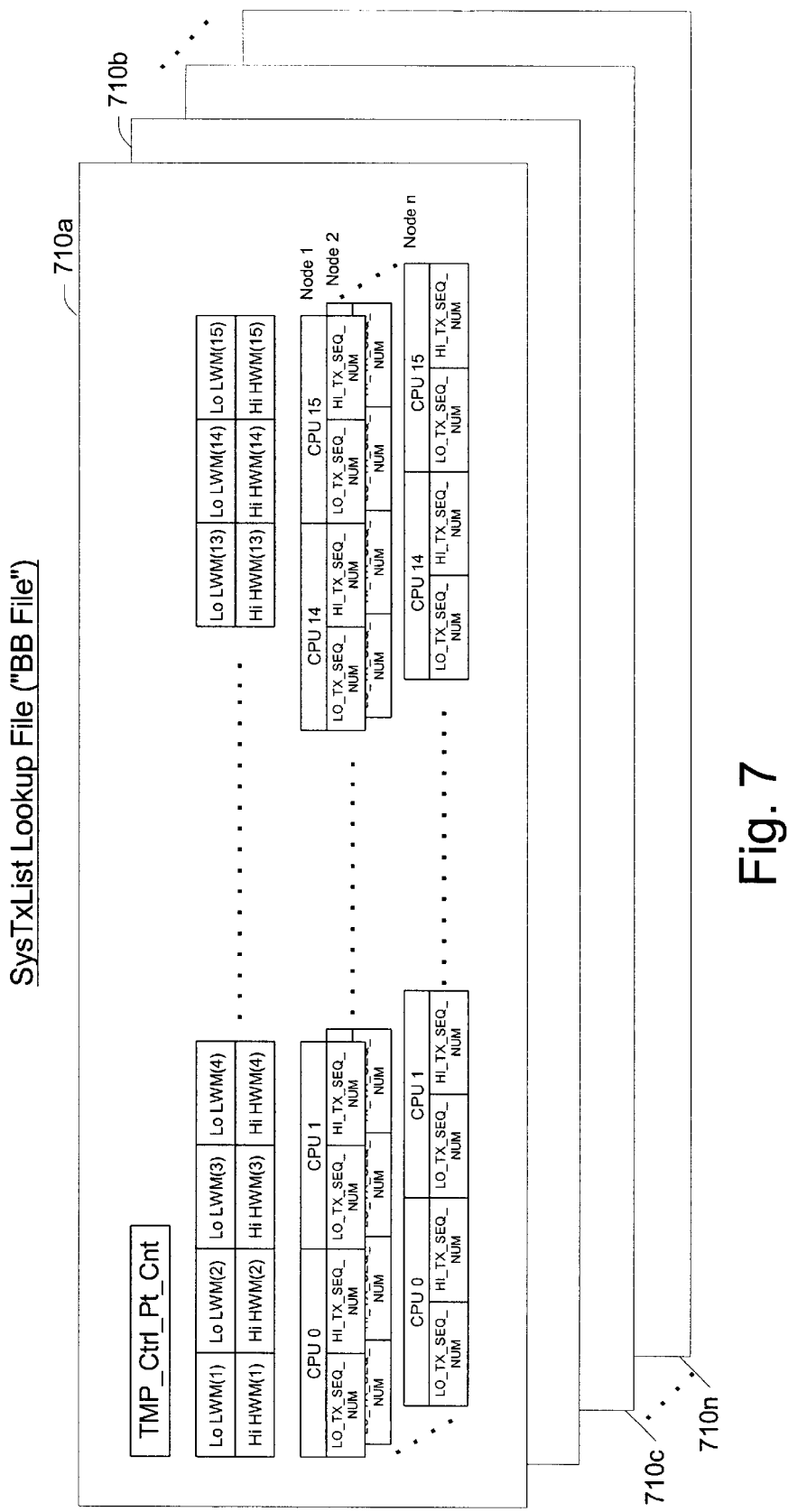
FIG. 7 depicts a SysTxList Lookup File generated by the database replication system in furtherance of an embodiment of the present invention.

A SysTxList Lookup File (also called "BB file"), which includes a number of SysTxList Records 710a–710n, is depicted in FIG. 7. As shown, each SysTxList Record includes a TMP Control Point Count value (TMP_Ctrl_Pt_Cnt) that is associated with a TMP Control Time Frame. Each SysTxList Record further includes Lowest Low-Water-Marks (Lo LWM[n]) and Highest High-Water-Marks (Hi HWM[n]) for each of the Auxiliary Audit Trails. In a presently preferred embodiment, there may be up to fifteen Auxiliary Audit Trails. Thus, in FIG. 7, there are fifteen Lowest Low-Water-Marks and fifteen Highest High-Water-Marks in each of the SysTxList Records 710a–710n. A Lowest Low-Water-Mark of a Auxiliary Audit Trail herein refers to the lowest Low-Water-Mark associated with that Auxiliary Audit Trail among all the Low-Water-Marks of that Auxiliary Audit Trail found in the Auxiliary Pointer Records the Master Receiver 132 received in the TMP Control Time Frame. A Highest High-Water-Mark of an Auxiliary Audit Trail herein refers to the highest High-Water-Mark associated with that Auxiliary Audit Trail in the Auxiliary Pointer Records the Master Receiver received in the TMP Control Time Frame.

Also illustrated in FIG. 7 are CPU-Node arrays in each SysTxList Record 710a–710n. In a presently preferred embodiment, the local computer system may have multiple nodes, and each node having multiple processors (CPUs). Furthermore, each processor in the local computer system independently assigns monotonically increasing sequence numbers (Transaction Sequence Numbers TX_SEQ_NUM) to the transactions it executes. For each CPU in each Node, a SysTxList Record stores a Low Transaction Sequence Number (LO_TX_SEQ_NUM) and a High Transaction Sequence Number (HI_TX_SEQ_NUM). That is, for each CPU in each Node, a SysTxList Record stores information that indicates a range of transactions that were processed during a TMP Control Time Frame. In the present embodiment, the information stored in the SysTxList will be used by a Purger to determine whether a Image Trail File can be purged.

According to the presently preferred embodiment, the SysTxList Record that is associated with a particular TMP Control Point Count can be easily looked up because the SysTxList Lookup Files ("BB file") each contain a fixed number of SysTxList records. For instance, if each of the SysTxList Lookup Files contains ten (10) SysTxList records, and if it is desired to look up the SysTxList record associated with the TMP Control Point Count of ninety-five (95), the Purger can quickly access the fifth record of the tenth SysTxList Lookup File without searching all the SysTxList Lookup Files. This significantly increases the efficiency of the Purger.

Due to imbalances of activities in the primary database, some SITs may be significantly more active than others. Thus, some Image Trail Files will be "rolling over" much more quickly than other Image Trail Files. For instance, audit records in one MAT-based SIT may be require multiple Image Trail Files while audit records of another MAT-based SIT may be filling a fraction of an Image Trail File. In this situation, the Image Trail File of the "slower" image trail will have an old TMP Control Point Count in the header of the file. In the presently preferred embodiment, the Receiver processes are configured to write a "fake" audit record into an Image Trail File if that Image Trail File has not rolled over for more than a predetermined amount of time (e.g., an hour). The "fake" audit record will contain a recent TMP Control Point Count if the Image Trail File is associated with a MAT-based SIT or a recent High-Water-Mark if the Image Trail File is associated with an AuxAT-based SIT. When the Updater encounters the "fake" audit record, it will realize that the "fake" record does not contain any audit records but a more updated TMP Control Point Count or High-Water-Mark. The Updater will then replace the header information it read from the Image Trail File's header with the more updated information. The Updater will then send the more updated information to the Purger.

In some embodiments, the header of an Image Trail File may be periodically updated if the Image Trail File has not rolled over for more than a predetermine amount of time.

Updater Processes—Overview

Each RDF-protected volume 106 on the primary computer system 110 has its own Updater process 134 on the backup computer system 122 that is responsible for applying audit image records to the corresponding backup volume 126 on the backup computer system 122 so as to replicate the audit protected files on that volume. Audit image records associated with both committed and aborted transactions on the primary system are applied to the database on the remote backup computer system 122. In RDF system 120, no attempt is made to avoid applying aborted transactions to the backup database, because it has been determined that it is much more efficient to apply both the update and backout audit for such transactions than to force the Updaters to wait until the outcome of each transaction is known before applying the transaction's updates to the backup database. By simply applying all logical audit to the backup database, the Updaters are able to keep the backup database substantially synchronized with the primary database. Also, this technique avoids disruptions of the RDF system caused by long running transactions. In some RDF systems, long running transactions would cause the backup system to completely stop applying audit records to the backup database until such transactions completed.

The audit image records in each image trail 136, 138 are typically read and processed by one to ten Updaters 134. Each Updater 134 reads all the audit image records in the corresponding image trail, but utilizes only the audit image records associated with the primary disk volume 106 for which that Updater is responsible.

In a presently preferred embodiment, the Master Receiver process 132 and the Auxiliary Receiver processes 133 inform the Updaters 134 how far they should read by sending limit positions to the Updaters 134. When an Updater 134 reaches a limit position, which is treated by the Updater as the logical end of file of the image trail 136,138 to which it is assigned, it performs a wait for a preselected amount of time, such as two to ten seconds before sending another message to the Receiver to request an updated limit position. Only when the limit position is updated can the Updater read more audit image records. Updater limit positions for MAT-based Updaters are described in detail in the above-referenced patent applications and patents. The limit position for an AuxAT-based Updater (i.e., an Updater that applies audit records from an AuxAT-based SIT to the backup database) is the High-Water-Mark position of the associated AuxAT received by the corresponding Auxiliary Receiver 133 from the Master Receiver 132. For instance, the limit position for Updaters 134-4 and 134-5 will be the High-Water-Mark position of the AuxAT 105-2 received by Auxiliary Receiver 133-2.

In accordance with an embodiment of the present invention, when the MAT-based Updaters (e.g., Updaters 134-1 and 134-2) read the image trails and update the backup database, the MAT-based Updaters read the headers of the Image Trail Files and extract the TMP Control Point Counts therefrom. When an AuxAT-based Updater (e.g., Updater 134-3, 134-4 or 134-5) reads the image trail and updates the backup database, the Aux-based Updater read the headers of the Image Trail Files and extracts the Audit Trail Positions that were stored therein by the Auxiliary Receivers 133. The Updaters 134 periodically send the TMP Control Point Counts and High-Water-Mark positions extracted from the currently processed Image Trail Files to the Purger 140.

The Updaters 134 have two types of operations: a redo pass and an undo pass. The redo pass is the normal mode of operation, in which update and backout audit is "redone" to a backup volume. The undo pass, which is not performed in the normal mode of operation, is used for removing all database changes caused by questionable transactions. For example, transactions whose final outcome is unknown are "undone," and transactions that may be missing audit records are also "undone" despite of the status of their last known state. The undo pass is typically performed in a Takeover operation, or when the primary computer system fails. Detailed descriptions of the Undo and the Redo operations performed by an Updater is described in detail in the above referenced patents and patent applications.

Purger Process

After audit records of completed transactions are applied to the backup database volumes 126, those audit records will no longer be needed. When an Image Trail File contains nothing but audit records that are no longer needed, that Image Trail File can be permanently deleted without any adverse effect to the RDF system. In a presently preferred embodiment, the Purger 140 is responsible for identifying and purging Image Trail Files that are no longer needed.

Figure 5:
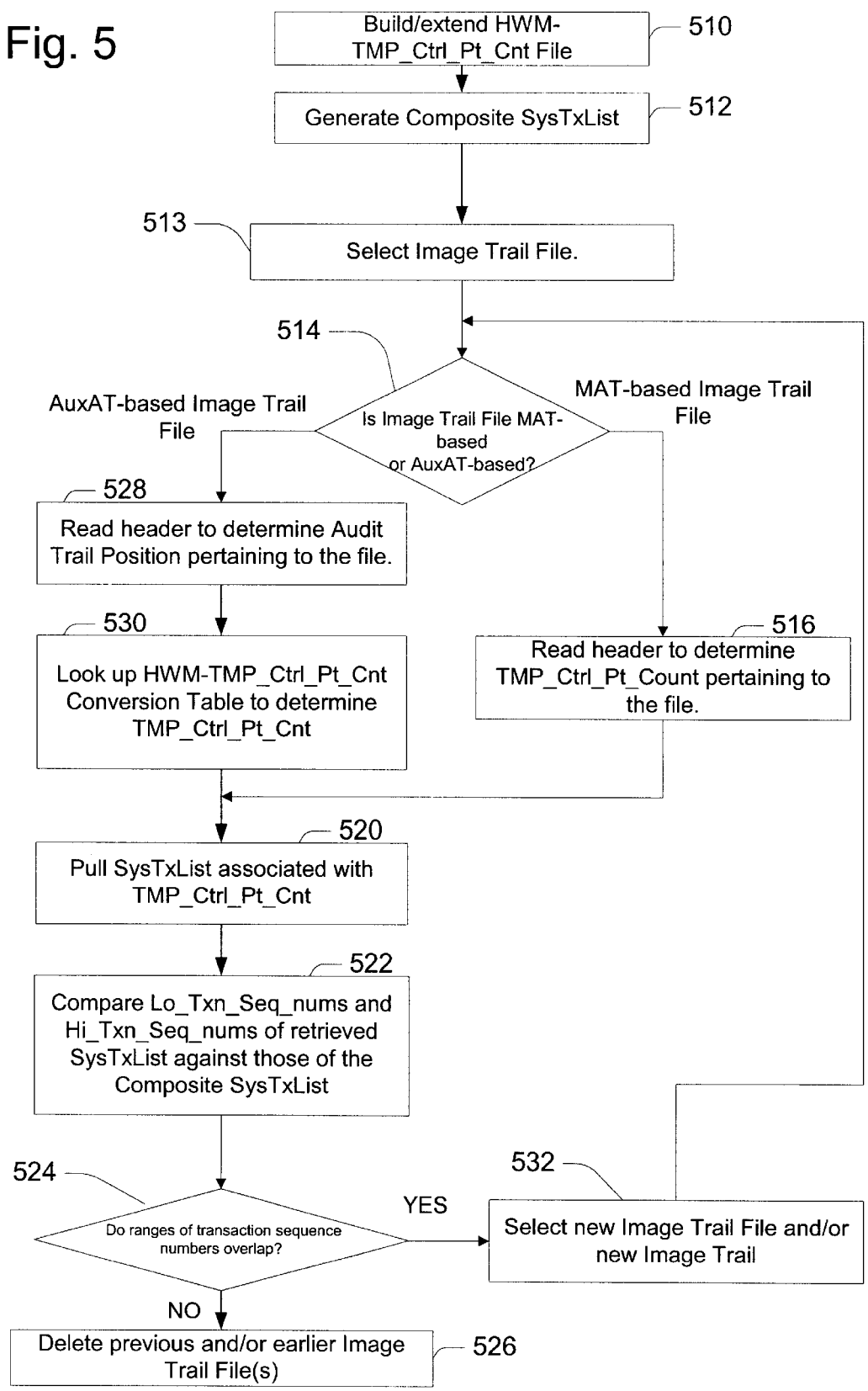
FIG. 5 is a flow diagram illustrating a process of purging database update image files in accordance with an embodiment of the present invention.

FIG. 5 is a flow diagram depicting a Purger pass in accordance with a presently preferred embodiment of the present invention. In this embodiment, the Purger pass is initiated periodically when triggered by a timer. For instance, the RDF system 120 may be programmed to perform a Purger pass once a day. How often the Purger pass should be performed depends on the storage capacity for the image trails, the rate at which audit records are received by the remote computer system and the rate at which audit records are applied to the backup database volumes.

Figure 8:
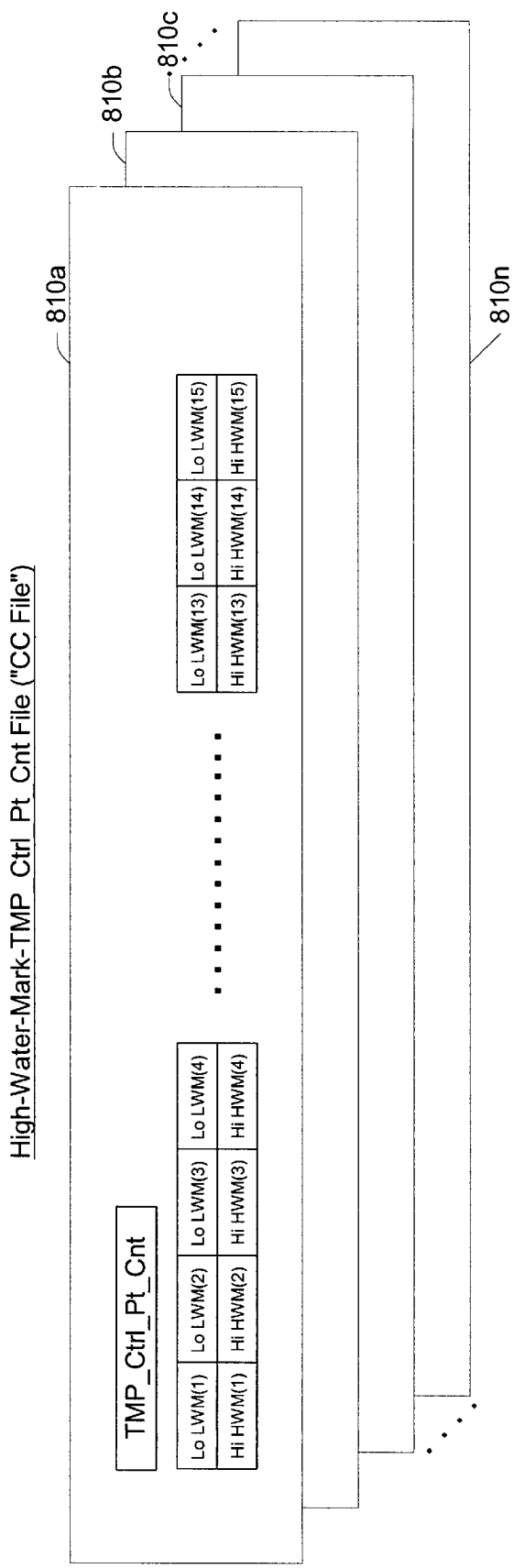
FIG. 8 depicts a High-Water-Mark-to-TMP Control Point Count File generated by the Purger in accordance with an embodiment of the present invention.
Figure 9:
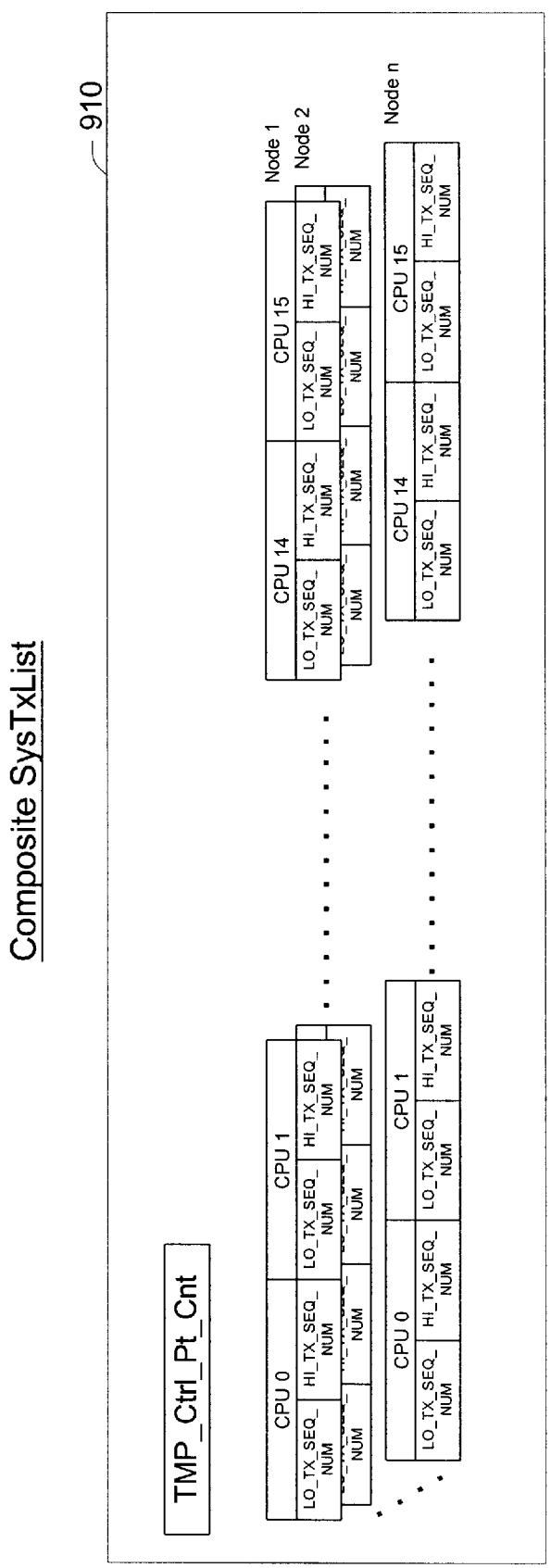
FIG. 9 depicts a Composite SysTxList generated by the Purger in accordance with an embodiment of the present invention.

At step 510, the Purger begins the a pass by building a HWM-TMP__Ctrl__Pt__Cnt File if one does not already exist. If a HWM-TMP__Ctrl__Pt__Cnt File has been previously built, the Purger constructs new HWM-TMP__Ctrl__Pt__Cnt records and appends the new records to the file. An example of a HWM-TMP__Ctrl__Pt__Cnt File with multiple HWM-TMP__Ctrl__Pt__Cnt records 810a–810n, each corresponding to a specific TMP Control Point Count, is depicted in FIG. 8. In the present embodiment, HWM-TMP__Ctrl__Pt__Cnt records are constructed by examining all SysTxList records that have been generated since the previous execution of the Purger pass and by removing the Node/CPU/Transaction Sequence Number arrays from those SysTxList records. As such, each HWM-TMP__Ctrl__Pt__Cnt record contains a TMP Control Point Count value (TMP__Ctrl__Pt__Cnt) and Lowest Low-Water-Marks (Lo LWM[n]) and Highest High-Water-Marks (Hi HWM[n]) for each of the Auxiliary Audit Trails. In a presently preferred embodiment, there may be up to fifteen Auxiliary Audit Trails. Thus, in FIG. 8, there are fifteen Lowest Low-Water-Marks and fifteen Highest High-Water-Marks in each of the HWM-TMP__Ctrl__Pt__Cnt records 810a–810n. A Lowest Low-Water-Mark indicates the lowest Low-Water-Mark in the Auxiliary Pointer Records the Master Receiver received in a particular TMP Control Time Frame. A High High-Water-Mark herein refers to the highest High-Water-Mark in the Auxiliary Pointer Records that the Master Receiver received in that same TMP Control Time Frame. Together, the Lowest Low-Water-Marks and the Highest High-Water-Marks indicate a range of audits that are written to the Auxiliary Audit Trails during a TMP Control Time Frame defined by the TMP Control Point Count.

Figure 6:
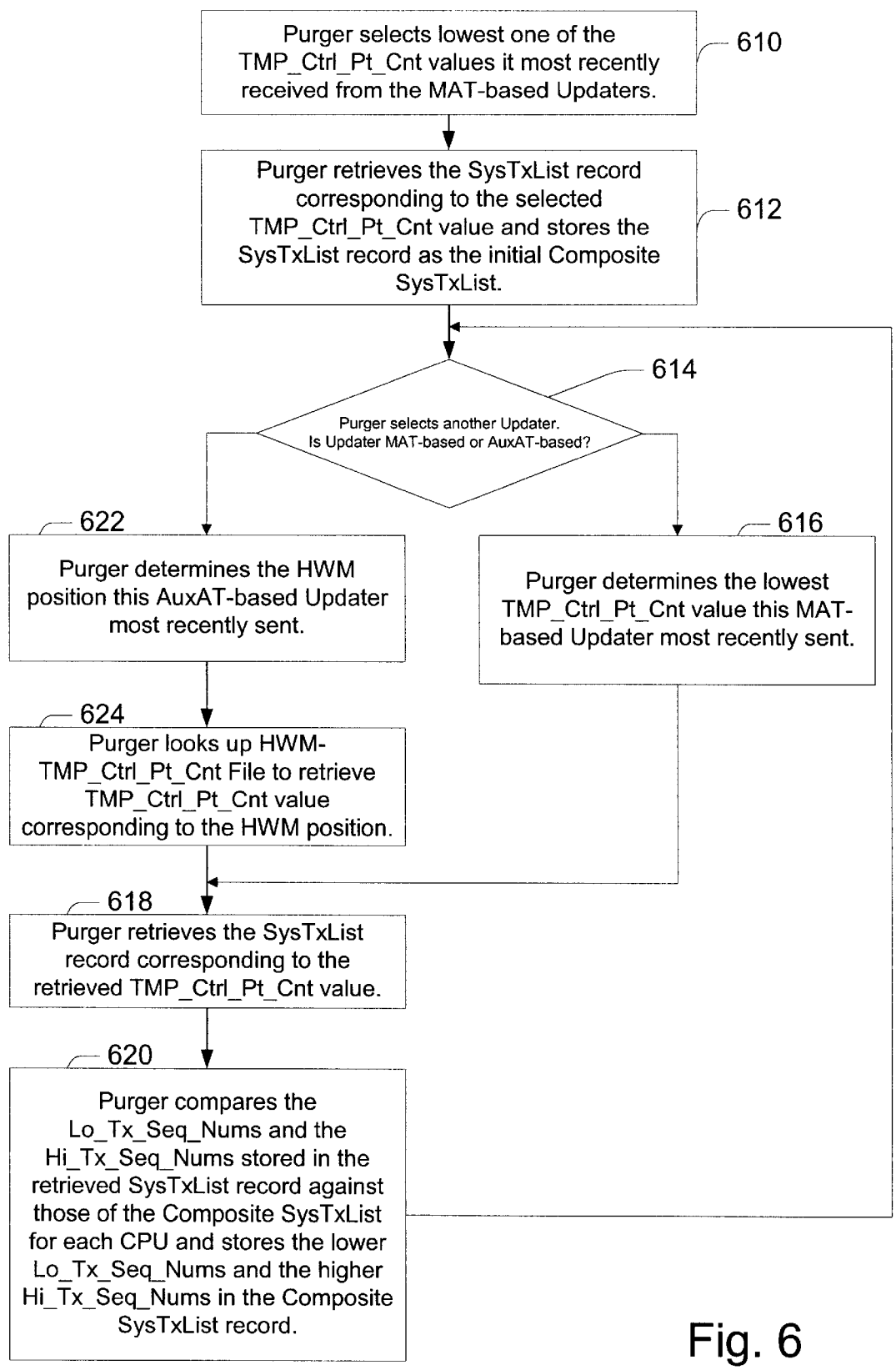
FIG. 6 is a flow diagram illustrating a process of generating a Composite SysTxList in accordance with an embodiment of the present invention.

With reference again to FIG. 5, at step 512, the Purger generates a Composite SysTxList. Steps for generating the Composite SysTxList are illustrated in FIG. 6 and will be discussed in the following. In the present embodiment, the Composite SysTxList contains information that indicates, for each CPU in each node of the local computer system, the maximum span of all Transaction Sequence Numbers corresponding to the TMP Control Time Frames the Updaters are currently processing.

Then, at step 513, an Image Trail and an Image Trail File is selected. In one embodiment of the present invention, the Purger initially selects the Image Trail File that the slowest one of the Updaters of that trail is reading. Furthermore, in the present embodiment, the system has a RETAINCOUNT value that indicates a range of Image Trail Files that should not be purged, despite the fact that some files may not contain any information that will be needed. In other words, the Purger does not select Image Trail Files that are not at least a few files removed from the Image Trail Files that are currently being read by the Updaters. For example, if the slowest Updater is reading Image Trail File #12345, and if the RETAINCOUNT value is configured to be two, then the Purger will not select Image Trail File #12344, even if that Image Trail File does not contain any audit records needed by the Updaters.

At step 514, the Purger determines whether the selected Image Trail File is a MAT-based Image Trail File or an AuxAT-based Image Trail File.

At step 516, if the selected Image Trail File is a MAT-based Image Trail File, the Purger reads the TMP Control Point Count value (TMP__Ctrl__Pt__Cnt) from its header. Recall that, when a new MAT-based Image Trail File is first opened, the Receiver processes write in the file's header a TMP Control Point Count associated with the audit records that are being stored in the Image Trail File.

At step 528, if the selected Image Trail File is an AuxAT-based Image Trail File, the Purger reads the Audit Trail Position stored in its header. Recall that, when an AuxAT-based Image Trail File is created, the Receiver process write in the file's header the Audit Trail Position of the last audit record in the previous Image Trail File.

AuxAT-based Image Trail Files, unlike MAT-based Image Trail Files, do not contain TMP Control Point Count Information. Therefore, if the selected Image Trail File is an AuxAT-based Image Trail File, the Purger reads the header to determine the High-Water-Mark position contained therein (step 528) and then looks up the HWM-TMP__Ctrl__Pt__Cnt File to determine the TMP Control Point Count associated with the High-Water-Mark position (step 530).

At step 520, regardless of whether the Image Trail File is MAT-based or AuxAT-based, the Purger retrieves a SysTxList record corresponds to the obtained TMP Control Point Count. In other words, a SysTxList record corresponding to the current TMP__Ctrl__Pt__Cnt value is retrieved. Recall that, in a presently preferred embodiment, each SysTxList Lookup File has a predetermined number of SysTxList records, and the SysTxList Lookup Files have file names that consist of monotonously increasing sequence numbers. Thus, given the TMP Control Point Count, the corresponding SysTxList record can be quickly retrieved.

Then, at step 522, the Purger determines, for each CPU in each Node, whether the ranges of Transaction Sequence Numbers (defined by the Low Transaction Sequence Number and the High Transaction Sequence Number of each CPU in each Node) of the retrieved SysTxList record overlap those of the Composite SysTxList.

At step 524, if it is determined that there ranges of Transaction Sequence Numbers do not overlap, then it can be concluded that the preceding Image Trail Files no longer contain any audit records that will be needed by the Updaters. Accordingly, the preceding Image Trail Files can be purged. If, however, the ranges of Transaction Sequence Numbers overlap, then no purging is performed, and the preceding Image Trail File is selected (Step 532). If all the Image Trail Files in the Image Trail have been selected, the Purger process selects another image Trail (Step 532). If all the Image Trails have been processed, the a dormant mode until it is awaken by a timer after a predetermined period of time.

Generation of Composite SysTxList

FIG. 6 is a flow diagram depicting a process for generating a Composite SysTxList in accordance with an embodiment of the present invention. As shown, the Purger selects the lowest TMP Control Point Count value from among all the TMP Control Point Count values it most recently received from the MAT-based Updaters (Step 610).

Then, the Purger retrieves the SysTxList record corresponding to the selected TMP Control Point Count value. The SysTxList record is then stored as the Composite SysTxList (Step 612).

The Purger then selects an Updater and determines whether the Updater is MAT-based or AuxAT-based (Step 614).

If the Updater is MAT-based, the Purger determines the TMP Control Point Count value that this Updater has most recently sent to the Purger (Step 616).

If, however, the Updater is AuxAT-based, the Purger determines the High-Water-Mark position the Updater has most recently sent to the Purger (Step 622). The Purger then looks up the HWM-TMP_Ctrl_Pt_Cnt File to retrieve the TMP Control Point Count value associated with that High-Water-Mark position (step 624).

Regardless of whether the Updater is MAT-based or AuxAT-based, the Purger retrieves the SysTxList record corresponding to the TMP Control Point Count value (Step 618) and compares, for each CPU in each Node, the Low Transaction Sequence Numbers (LO_TX_SEQ_NUM) and the High Transaction Sequence Numbers (HI_TX_SEQ_NUM) of the retrieved SysTxList record against those of the Composite SysTxList (step 620).

If a Low Transaction Sequence Number for a particular CPU of a particular Node in the retrieved SysTxList record is lower than that stored in the Composite SysTxList, the Low Transaction Sequence Number of the retrieved SysTx-List Record becomes the Low Transaction Sequence Number for that particular CPU in the Composite SysTxList. If a High Transaction Sequence Number for a particular CPU of a particular Node in the retrieved SysTxList record is higher than that stored in the Composite SysTxList, the High Transaction Sequence Number of the retrieved SysTxList record becomes the High Transaction Sequence Number for that particular CPU in the Composite SysTxList (step 622).

The Purger then selects another Updater and repeats steps 616 through 620 until all the Updaters have been processed. The resultant Composite SysTxList now contains, for each CPU in each Node, the lowest Low Transaction Sequence Number and the highest High Transaction Sequence Number. The lowest Low Transaction Sequence Number and the highest High Transaction Sequence Number represent, for each CPU in each node of the local computer system, the maximum span of all Transaction Sequence Numbers corresponding to the TMP Control Time Frames the Updaters are currently processing. Thus, in the occurrence of a predetermined event, such as failure of the local computer system, the Updaters may need to undo these transactions. Consequently, the Image Trail Files associated with these transactions cannot be purged.

In a presently preferred embodiment, the SysTxList records are stored in SysTxList Lookup Files or "BB" files. The HWM-TMP_Ctrl_Pt_Cnt records are stored in sequentially numbered files of fixed size called HWM-TMP_Ctrl_Pt_Cnt Files or "CC" files. The BB files and the CC files may themselves be purged by the Purger after a file purging pass. In particular, the Purger keeps track of the lowest one of the TMP Control Point Count values it encountered during the file purging pass and during the construction of the Composite SysTxList. BB files containing SysTxList records corresponding to TMP Control Point Counts that are lower than the lowest TMP Control Point Count value can be deleted. Recall that the SysTxList Lookup Files are stored in sequentially numbered files each having a fixed number (configurable for each system) of SysTxList records. Thus, BB files that contain SysTxList records that are no longer needed can be quickly identified. The Purger also keeps track of the lowest one of the High-Water-Mark positions it encountered for each Auxiliary Trail during the construction of the HWM-TMP_Ctrl_Pt_Cnt Conversion Table. CC files containing HWM-TMP_Ctrl_Pt_Cnt records with High-Water-Marks that are lower than the lowest Low-Water-Marks can also be deleted.

Alternate Embodiments

The tasks performed by the Receiver, Updater, and Purger processes of the preferred embodiment can, in other embodiments, be performed by processes performing other tasks as well, or by a different set of processes.

The present invention can be implemented as a computer program product that includes a computer program mechanism embedded in a computer readable storage medium. For instance, the computer program product could contain the program modules for one or more of the Receiver, Updater and Purger processes. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention.

What is claimed is:

1. A method of operating a backup system so as to replicate database updates performed on a primary system, the method comprising:

receiving a first stream of first audit records from the primary system, the first audit records including first audit update records indicating database updates generated by transactions executing on the primary system and control point records defining control time frames at which the first audit update records were generated by the primary system;

upon receiving each of the control point records, generating a system transaction record representing a range of transaction identifiers for transactions executed in the primary system during the control time frame associated with the control point record, the system transaction record further having a control point count representative of the control time frame;

storing the first audit update records in one or more first image trails, and storing each first image trail in first image trail files;

storing in each first image trail file a control point count for identifying the control time frame at which the first image trail file is created;

concurrently for each of the first image trails, applying the first audit records to a backup database in the sequence of the first image trail files; and periodically executing a file purge procedure for purging image trail files no longer needed, including:

building a composite system transaction record to identify a maximum span of transaction identifiers corresponding to control time frames associated with the first audit records currently applied to the backup database, selecting one of the first image trail files and identifying the control point count stored in the selected first image trail file;

retrieving a first one of the system transaction records that corresponds to the identified control point count; and comparing a first set of transaction identifiers in the first system transaction record to second set of transaction identifiers in the composite system transaction record, and purging the accessed first image trail file provided all of the transaction identifiers in the first set are older than corresponding transaction identifiers in the second set.

2. The method of claim 1, wherein the building step comprises:

determining a set of the system transaction records that are generated since a previous execution of the file purge procedure; and storing a lowest transaction identifier and a highest transaction identifier of the set of the system transaction records in the composite system transaction record.

3. The method of claim 1, further comprising:

receiving a second stream of second audit records, the second audit records including audit update records indicating database updates generated by transactions executing on the primary system;

storing the second audit records in one or more second image trails, and storing each of the second image trails in second image trail files;

for each of the second image trails, storing in each second image trail file an audit trail position associated with a last audit update record stored in a previous one of the second image files of the same second image trail, the audit trail position being associated with one of the control time frames;

concurrently for each second image trail, applying the second audit records to the backup database in the sequence of second image trail files; and the file purge procedure purging second image trail files no longer needed, including:

constructing a conversion table that indicates, for each of the control point counts, a range of second audit records associated with each of the control point counts;

accessing one of the second image trail file and identifying an audit trail position stored within the accessed second image trail file;

looking up the conversion table to determine a control point count associated with the retrieved audit trail position;

retrieving a second one of the system transaction records associated with the determined control point count; and comparing a third set of transaction identifiers in the second system transaction record to the second set of transaction identifiers in the composite system transaction record, and purging the accessed second image trail file provided that all of the transaction identifiers in the third set are older than corresponding transaction identifiers in the second set.

4. The method of claim 3, wherein the step of periodically executing a file purge procedure includes:

for each first image trail for which there are more than a predefined number of first image trail files that have not been processed, performing the steps of accessing a first image trail file, comparing the first and second sets of transaction identifiers, and conditionally purging the accessed first image trail file; and for each second image trail for which there are more than the predefined number of second image trail files that have not been processed, performing the steps of accessing a second image trail file, comparing the second and third sets of transaction identifiers, and conditionally purging the accessed second image trail file.

5. The method of claim 3, wherein the step of periodically executing a file purge procedure includes:

for each first image trail for which there are more than a predefined number of first image trail files that have not been processed, accessing the first image trail files in reverse chronological order, excluding the predefined number of most recent first image trail files;

for each accessed first image trail file comparing the first and second sets of transaction identifiers; and purging the accessed first image trail file provided all of the transaction identifiers in the first set are older than corresponding transaction identifiers in the second set.

6. The method of claim 5, wherein the step of periodically executing a file purge procedure further comprises:

for each second image trail for which there are more than the predefined number of second image trail files that have not been processed, accessing the second image trail files in reverse chronological order, excluding the predefined number of most recent second image trail files;

for each accessed second image trail file comparing the second and third sets of transaction identifiers; and purging the accessed second image trail file provided all of the transaction identifiers in the third set are older than corresponding transaction identifiers in the second set.

7. A computer program product for use in conjunction with a backup computer system so as to replicate database updates performed on a primary system, the computer program product comprising a computer readable storage medium and a computer program mechanism embedded therein, the computer program mechanism comprising:

a Master Receiver Module that receives and stores in one or more first image trails a stream of first audit records received from the primary system, the first audit records including audit update records indicating database updates generated by transactions executing on the primary system and control point records defining control time frames at which the first audit update records were generated by the primary system;

the Master Receiver Module, upon receiving each of the control point records, generating a system transaction record representing a range of transaction identifiers for transactions executed in the primary system during the control time frame associated with the control point record, each system transaction record further having a control point count representative of the control time frame;

the Master Receiver Module storing each first image trail in a sequence of first image trail files and storing in each first image trail file a control point count associated with a last audit record stored in a previous one of the first image trail files;

an Updater Module for each first image trail that sequentially applies to a backup database the database updates indicated by the audit update records, in the order the audit update records are stored in the first image trails; and a Purger Module for periodically executing a file purge procedure for purging image trail files no longer needed, the Purger Module including instructions for:

building a composite system transaction record to identify a maximum span of transaction identifiers corresponding to control time frames associated with the first audit records currently applied to the backup database, selecting one of the first image trail files and identifying the control point count stored in the selected first image trail file;

retrieving a first one of the system transaction records that corresponds to the identified control point count; and comparing a first set of transaction identifiers in the first system transaction record to second set of transaction identifiers in the composite system transaction record, and purging the accessed first image trail file provided all of the transaction identifiers in the first set are older than corresponding transaction identifiers in the second set.

8. The computer program product of claim 7, wherein the Purger module further comprises instructions for:

determining a set of the system transaction records that are generated since a previous execution of the file purge procedure; and storing a lowest transaction identifier and a highest transaction identifier of the set of the system transaction records in the composite system transaction record.

9. The computer program product of claim 7, further comprising:

a Receiver Module that receives and stores in one or more second image trails a stream of second audit records received from the primary system, the second audit records including audit update records indicating database updates generated by transactions executing on the primary system;

the Receiver Module storing each second image trail in a sequence of second image trail files and storing in each second image trail file an audit trail position associated with a last audit update record stored in a previous one of the second image files;

an Updater Module for each second image trail that sequentially applies to a backup database the database updates indicated by the audit update records, in the order the audit update records are stored in the second image trails; and wherein the Purger Module further comprises instructions for:

constructing a conversion table that indicates, for each of the control point counts, a range of second audit records associated with each of the control point counts;

accessing one of the second image trail file and identifying an audit trail position stored within the accessed second image trail file;

looking up the conversion table to determine a control point count associated with the retrieved audit trail position;

retrieving a second one of the system transaction records associated with the determined control point count; and comparing a third set of transaction identifiers in the second system transaction record to the second set of transaction identifiers in the composite system transaction record, and purging the accessed second image trail file provided that all of the transaction identifiers in the third set are older than corresponding transaction identifiers in the second set.

10. The computer program product of claim 9, wherein Purger Module further includes instructions for:

for each first image trail for which there are more than a predefined number of first image trail files that have not been processed, performing the steps of accessing a first image trail file, comparing the first and second sets of transaction identifiers, and conditionally purging the accessed first image trail file; and for each second image trail for which there are more than the predefined number of second image trail files that have not been processed, performing the steps of accessing a second image trail file, comparing the second and third sets of transaction identifiers, and conditionally purging the accessed second image trail file.

11. The computer program product of claim 9, wherein Purger Module further includes instructions for:

for each first image trail for which there are more than a predefined number of first image trail files that have not been processed, accessing the first image trail files in reverse chronological order, excluding the predefined number of most recent first image trail files;

for each accessed first image trail file comparing the first and second sets of transaction identifiers; and purging the accessed first image trail file provided all of the transaction identifiers in the first set are older than corresponding transaction identifiers in the second set.

12. The computer program product of claim 11, wherein Purger Module further includes instructions for:

for each second image trail for which there are more than the predefined number of second image trail files that have not been processed, accessing the second image trail files in reverse chronological order, excluding the predefined number of most recent second image trail files;

for each accessed second image trail file comparing the second and third sets of transaction identifiers; and purging the accessed second image trail file provided all of the transaction identifiers in the third set are older than corresponding transaction identifiers in the second set.

13. A backup computer system for replicating database updates performed on a primary system, comprising:

a backup database;

a Master Receiver Module that receives and stores in one or more first image trails a stream of first audit records received from the primary system, the first audit records including audit update records indicating database updates generated by transactions executing on the primary system and control point records defining control time frames at which the first audit update records were generated by the primary system;

the Master Receiver Module, upon receiving each of the control point records, generating a system transaction record representing a range of transaction identifiers for transactions executed in the primary system during the control time frame associated with the control point record, each system transaction record further having a control point count representative of the control time frame;

the Master Receiver Module storing each first image trail in a sequence of first image trail files and storing in each first image trail file a control point count associated with a last audit record stored in a previous one of the first image trail files;

an Updater Module for each first image trail that sequentially applies to the backup database the database updates indicated by the audit update records, in the order the audit update records are stored in the first image trails; and a Purger Module for periodically executing a file purge procedure for purging image trail files no longer needed, the Purger Module including instructions for:

building a composite system transaction record to identify a maximum span of transaction identifiers corresponding to control time frames associated with the first audit records currently applied to the backup database, selecting one of the first image trail files and identifying the control point count stored in the selected first image trail file;

retrieving a first one of the system transaction records that corresponds to the identified control point count; and comparing a first set of transaction identifiers in the first system transaction record to second set of transaction identifiers in the composite system transaction record, and purging the accessed first image trail file provided all of the transaction identifiers in the first set are older than corresponding transaction identifiers in the second set.

14. The backup computer system of claim 13, wherein the Purger module further comprises instructions for:

determining a set of the system transaction records that are generated since a previous execution of the file purge procedure; and storing a lowest transaction identifier and a highest transaction identifier of the set of the system transaction records in the composite system transaction record.

15. The backup computer system of claim 13, further comprising:

a Receiver Module that receives and stores in one or more second image trails a stream of second audit records received from the primary system, the second audit records including audit update records indicating database updates generated by transactions executing on the primary system;

the Receiver Module storing each second image trail in a sequence of second image trail files and storing in each second image trail file an audit trail position associated with a last audit update record stored in a previous one of the second image files;

an Updater Module for each second image trail that sequentially applies to a backup database the database updates indicated by the audit update records, in the order the audit update records are stored in the second image trails; and wherein the Purger Module further comprises instructions for:

constructing a conversion table that indicates, for each of the control point counts, a range of second audit records associated with each of the control point counts;

accessing one of the second image trail file and identifying an audit trail position stored within the accessed second image trail file;

looking up the conversion table to determine a control point count associated with the retrieved audit trail position;

retrieving a second one of the system transaction records associated with the determined control point count; and comparing a third set of transaction identifiers in the second system transaction record to the second set of transaction identifiers in the composite system transaction record, and purging the accessed second image trail file provided that all of the transaction identifiers in the third set are older than corresponding transaction identifiers in the second set.

16. The backup computer system of claim 15, wherein Purger Module further includes instructions for:

for each first image trail for which there are more than a predefined number of first image trail files that have not been processed, performing the steps of accessing a first image trail file, comparing the first and second sets of transaction identifiers, and conditionally purging the accessed first image trail file; and for each second image trail for which there are more than the predefined number of second image trail files that have not been processed, performing the steps of accessing a second image trail file, comparing the second and third sets of transaction identifiers, and conditionally purging the accessed second image trail file.

17. The backup computer system of claim 15, wherein Purger Module further includes instructions for:

for each first image trail for which there are more than a predefined number of first image trail files that have not been processed, accessing the first image trail files in reverse chronological order, excluding the predefined number of most recent first image trail files;

for each accessed first image trail file comparing the first and second sets of transaction identifiers; and purging the accessed first image trail file provided all of the transaction identifiers in the first set are older than corresponding transaction identifiers in the second set.

18. The backup computer system of claim 17, wherein Purger Module further includes instructions for:

for each second image trail for which there are more than the predefined number of second image trail files that have not been processed, accessing the second image trail files in reverse chronological order, excluding the predefined number of most recent second image trail files;

for each accessed second image trail file comparing the second and third sets of transaction identifiers; and purging the accessed second image trail file provided all of the transaction identifiers in the third set are older than corresponding transaction identifiers in the second set.

* * * * *